(12) United States Patent
Takizawa et al.

(10) Patent No.: US 9,360,726 B2
(45) Date of Patent: Jun. 7, 2016

(54) LIQUID CRYSTAL DISPLAY

(71) Applicant: Sharp Kabushiki Kaisha, Osaka-shi, Osaka (JP)

(72) Inventors: Hideaki Takizawa, Osaka (JP); Masahiro Kihara, Osaka (JP); Isao Ogasawara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/378,130

(22) PCT Filed: Feb. 7, 2013

(86) PCT No.: PCT/JP2013/052789
§ 371 (c)(1),
(2) Date: Aug. 12, 2014

(87) PCT Pub. No.: WO2013/121956
PCT Pub. Date: Aug. 22, 2013

(65) Prior Publication Data
US 2015/0029433 A1      Jan. 29, 2015

(30) Foreign Application Priority Data

Feb. 15, 2012 (JP) .................................. 2012-030975

(51) Int. Cl.
*G02F 1/1345* (2006.01)
*G02F 1/1362* (2006.01)
(Continued)

(52) U.S. Cl.
CPC ........ *G02F 1/136286* (2013.01); *G02F 1/1345* (2013.01); *G02F 1/13452* (2013.01);
(Continued)

(58) Field of Classification Search
CPC ........................... G02F 1/13452; G02F 1/1345
See application file for complete search history.

(56) References Cited

U.S. PATENT DOCUMENTS

| | | | |
|---|---|---|---|
| 5,491,347 A * | 2/1996 | Allen ................... | G09G 3/3648 257/59 |
| 2008/0024416 A1 | 1/2008 | Onogi et al. | |

(Continued)

FOREIGN PATENT DOCUMENTS

| JP | 2008-032899 A | 2/2008 |
|---|---|---|
| JP | 2008-180928 A | 8/2008 |

(Continued)

OTHER PUBLICATIONS

Official Communication issued in International Patent Application No. PCT/JP2013/052789, mailed on Mar. 12, 2013.

*Primary Examiner* — Phu Vu
(74) *Attorney, Agent, or Firm* — Keating & Bennett, LLP

(57) ABSTRACT

The present invention provides a liquid crystal display that enables to enhance the resolution of a display screen, to narrow a flame portion, and to simplify the production process of an array substrate. The present invention provides a liquid crystal display including an array substrate, wherein the array substrate comprises: an insulating substrate; a first conductive layer on the insulating substrate; a first insulating layer on the first conductive layer; a second conductive layer on the first insulating layer; a second insulating layer on the second conductive layer; a third conductive layer on the second insulating layer; a third insulating layer on the third conductive layer; a fourth conductive layer on the third insulating layer; a plurality of bus lines; a plurality of lead wires; a common electrode provided in the third conductive layer; a common trunk wiring provided outside a display region, crossing the lead wires, and transmitting a common signal; and a connection electrode provided outside the display region and connecting the common electrode with the common trunk wiring, the wiring being provided in the first conductive layer, the plurality of lead wires being provided in the second conductive layer above the common trunk wiring, the connection electrode being provided at least in the fourth conductive layer.

27 Claims, 12 Drawing Sheets

(51) Int. Cl.
*G02F 1/1333* (2006.01)
*G02F 1/1343* (2006.01)

(52) U.S. Cl.
CPC .... *G02F1/133345* (2013.01); *G02F 1/134309* (2013.01); *G02F 1/136227* (2013.01); *G02F 2001/134372* (2013.01); *G02F 2201/121* (2013.01)

(56) References Cited

U.S. PATENT DOCUMENTS

| | | |
|---|---|---|
| 2008/0180622 A1 | 7/2008 | Horiguchi et al. |
| 2009/0268145 A1* | 10/2009 | Anjo ................ G02F 1/13463 349/141 |
| 2009/0323005 A1 | 12/2009 | Ota |
| 2011/0080549 A1 | 4/2011 | Jung et al. |
| 2012/0300152 A1 | 11/2012 | Anjo et al. |
| 2012/0313845 A1 | 12/2012 | Onogi et al. |
| 2014/0111755 A1 | 4/2014 | Anjo et al. |

FOREIGN PATENT DOCUMENTS

| | | |
|---|---|---|
| JP | 2009-265484 A | 11/2009 |
| JP | 2010-008758 A | 1/2010 |
| JP | 2010-272706 A | 12/2010 |

* cited by examiner

Fig. 11
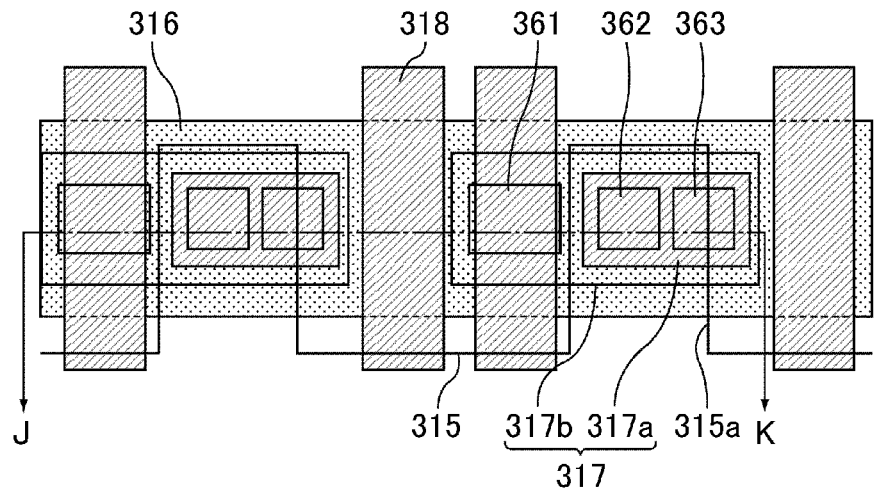
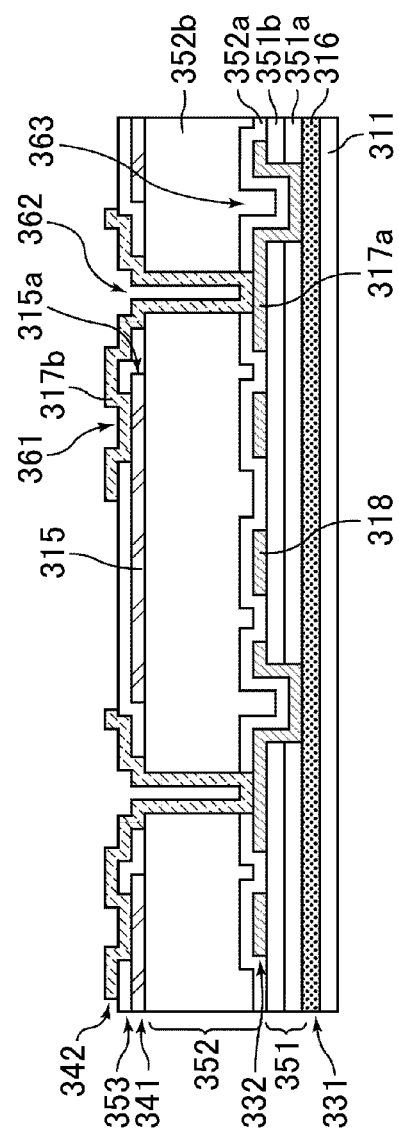
Fig. 12

LIQUID CRYSTAL DISPLAY

TECHNICAL FIELD

The present invention relates to a liquid crystal display. More specifically, the present invention relates to a liquid crystal display suitably used as a liquid crystal display equipped with an array substrate including an electrode (hereafter, also referred to as a common electrode) that supplies a signal (hereafter, also referred to as a common signal) in common to a plurality of pixels.

BACKGROUND ART

A liquid crystal display is a device that has a display portion including a plurality of pixels arranged therein and a flame portion around the display portion, and displays an image on the display portion utilizing electrooptic properties of liquid crystal molecules. Such liquid crystal displays are widely used for various devices such as mobile phones, laptops, and liquid crystal TVs. As such a liquid crystal display, an active matrix-driving liquid crystal display is well-known. A liquid crystal display of this type has an active matrix substrate (hereafter, also referred to as an array substrate). The array substrate commonly has wiring such as bus lines and lead wires connected to the bus lines, pixel electrodes, and switching elements such as thin film transistors (TFTs). As the bus lines, commonly, source bus lines and gate bus lines are provided.

Recently, liquid crystal displays have been required to have a higher-resolution screen in applications such as smartphones and tablet PCs, leading to narrower pitches between bus lines (e.g., source bus lines). In addition, display with a wider viewing angle has been also demanded.

Known examples of typical liquid crystal modes satisfying such demands include: the vertical alignment (VA) mode in which the alignment of liquid crystal molecules having negative dielectric anisotropy is controlled by application of an electric field in the direction orthogonal to the substrate surface; and the horizontal alignment mode in which the alignment of liquid crystal molecules having positive or negative dielectric anisotropy is controlled by application of an electric field (transverse electric field) in the horizontal direction (parallel direction) relative to the substrate surface. Moreover, a proposed liquid crystal display of the horizontal alignment mode is a liquid crystal display of the fringe field switching (FFS) type. A FFS liquid crystal display performs display by application of a fringe electric field (oblique electric field including the transverse electric field and vertical electric field) to a liquid crystal layer.

A disclosed FFS liquid crystal display is a FFS liquid crystal display in which a pixel electrode and a common electrode are positioned on a planarizing film so that plural contact holes can be formed at once in a single step (see Patent Literature 1).

Also disclosed is a FFS liquid crystal display capable of satisfactorily securing supply of a common potential to a common electrode and enhancing the aperture ratio of pixels to obtain bright display (see Patent Literature 2).

Also disclosed is a FFS liquid crystal panel in which the resistance value of a common electrode having a slit-like opening is decreased to reduce flicker and crosstalk (see Patent Literature 3).

CITATION LIST

Patent Literature

Patent Literature 1: JP-A 2008-180928
Patent Literature 2: JP-A 2008-32899
Patent Literature 3: JP-A 2010-8758

SUMMARY OF INVENTION

Technical Problem

In a FFS liquid crystal display, an array substrate commonly has a common electrode that is provided inside and outside a region corresponding to a display portion (hereafter, also referred to as a display region), and wiring that is provided outside the display region and transmits a common signal (hereafter, also referred to as common trunk wiring). To the common electrode, a common signal is supplied from the common trunk wiring.

FIGS. 5, 7, 8(b), and the like of Patent Literature 1 show a common wiring 16 corresponding to the common trunk wiring. FIGS. 1, 2, 7, and the like of Patent Literature 2 show an outer peripheral common potential line 50 corresponding to the common trunk wiring. The common wiring 16 is formed in a conductive layer in which a signal line 15 (corresponding to a source bus line) is also formed, the conductive layer being positioned above a conductive layer in which a scanning line 12 (corresponding to a gate bus line) is formed. The outer peripheral common potential line 50 is formed in a conductive layer in which a display signal line 18 (corresponding to a source bus line) is also formed, the conductive layer being positioned above a conductive layer in which a gate line 14 (corresponding to a gate bus line) is formed.

In a case where the common trunk wiring is formed in the conductive layer where the source bus line is also formed, however, in order to cross lead wires for the source bus lines with the common trunk wiring, the lead wires need to be delivered into a different layer. Accordingly, a contact hole for the crossing needs to be formed for each source bus line (see FIG. 7 of Patent Literature 2). As the resolution of the display screen is enhanced, a pitch of the source bus lines is narrowed and a pitch of the lead wires is also narrowed. In such a case, arrangement of all of these contact holes is very difficult due to a design problem. Even in a case where all the contact holes can be formed, they cannot be arranged in a line and would be arranged in two or more lines (for example, in a zigzag pattern). This arrangement problematically makes a flame portion larger.

In a case where the pixel electrode is arranged above the common electrode with an insulating layer interposed therebetween and the common electrode is directly connected to the common trunk wiring, a patterning step for forming contact holes in the insulating layer on the common electrode and a patterning step for forming contact holes in an insulating layer under the common electrode need to be separately performed. Such a production process still has a room for improvement in terms of simplification of the production process of the array substrate.

The present invention aims, in view of the state of the art, to provide a liquid crystal display that enables to enhance the resolution of a display screen, to narrow a flame portion, and to simplify the production process of an array substrate.

Solution to Problem

The present inventors have intensively studied the liquid crystal display that enables to enhance the resolution of a display screen, to narrow a flame portion, and to simplify the production process of an array substrate, and focused on a conductive layer in which a common trunk wiring is formed. They found out the following fact. In a case where a first conductive layer, a first insulating layer, and a second conductive layer are stacked on an insulating substrate in the stated order; a common trunk wiring is formed in the first conductive layer; and a lead wire is formed in the second conductive layer at a position corresponding to the common trunk wiring, such a configuration enables to connect the lead wire to a bus line such as a source bus line not through a contact hole and to arrange the common trunk wiring near the display region. They also found out the following. In a case where a second insulating layer, a third conductive layer, a third insulating layer, and a fourth conductive layer are stacked on the second conductive layer in the stated order; a common electrode is formed in the third conductive layer; the common electrode is connected to the common trunk wiring via a connection electrode; and the connection electrode is formed at least in the fourth conductive layer, such a configuration enables to form the contact holes in the third insulating layer and the contact holes in the second insulating layer in the same patterning step. As a result, they solved the above problem to arrive at the present invention.

Specifically, a liquid crystal display (hereafter, also referred to as a liquid crystal display according to the present invention) according to one aspect of the present invention includes: an array substrate; a display portion; and a plurality of pixels arranged in the display portion, wherein the array substrate includes: an insulating substrate; a first conductive layer on the insulating substrate; a first insulating layer on the first conductive layer; a second conductive layer on the first insulating layer; a second insulating layer on the second conductive layer; a third conductive layer on the second insulating layer; a third insulating layer on the third conductive layer; a fourth conductive layer on the third insulating layer; a plurality of bus lines provided in a region corresponding to the display portion (display region); a plurality of lead wires provided outside the region (display region) and each connected to a corresponding bus line; an electrode (common electrode) provided inside and outside the region (display region) and supplies a signal (common signal) in common to the plurality of pixels; a wiring (common trunk wiring) provided outside the region (display region), crossing the plurality of lead wires, and transmitting the signal (common signal); and a connection electrode provided outside the region (display region) and connecting the electrode (common electrode) with the wiring (common trunk wiring), the wiring (common trunk wiring) being provided in the first conductive layer, the plurality of lead wires being provided in the second conductive layer above the wiring (common trunk wiring), the electrode (common electrode) being provided in the third conductive layer, the connection electrode being provided at least in the fourth conductive layer.

The configuration of the liquid crystal display of the present invention is not especially limited as long as it essentially includes such components. The liquid crystal display may or may not include other components.

In the present description, for clarification, the boundary between the bus line and the lead wire is set on the outline of the display region. The bus line is provided inside the display region and the lead wire is provided in a region around the display region (hereafter, also referred to as a flame region).

Preferable embodiments of the liquid crystal display according to the present invention are described in the following. It is to be noted the following preferable embodiments may be appropriately combined with each other, and an embodiment combining two or more preferable embodiments is also a preferable embodiment.

The plurality of lead wires may include first and second lead wires adjacent to each other, a connecting portion between the connection electrode and the wiring (common trunk wiring) may be provided in a space between the first and second lead wires, and a connecting portion between the connection electrode and the electrode (common electrode) may not be provided in the space between the first and second lead wires. The two connecting portions not positioned in the region between the same two lead wires enables to further enhance the resolution of the display screen.

Preferably, the array substrate includes a portion not including the third insulating layer outside the region (display region) and on the electrode (common electrode), and the connection electrode is connected to the electrode (common electrode) through the portion not including the third insulating layer (hereafter, also referred to as a mode (1)). This enables to connect easily and surely the connection electrode to the common electrode.

In the mode (1), the portion not including the third insulating layer may not be positioned above the plurality of lead wires. In a case where the portion not including the third insulating layer does not overlap with the plurality of lead wires in a plan view of the array substrate, even if pinholes are present in the common electrode 15, the second insulating layer and the lead wires are prevented from being etched in the patterning step of the third insulating layer.

In the mode (1), the portion not including the third insulating layer may be positioned above the plurality of lead wires. In a case where the portion not including the third insulating layer overlaps with the plurality of lead wires in a plan view of the array substrate, the flexibility of design is enhanced.

In the mode (1), the array substrate may include a portion not including the first insulating layer and the second insulating layer on the wiring (common trunk wiring), the portion not including the third insulating layer may extend from a region above the portion not including the first insulating layer and the second insulating layer to a region on the electrode (common electrode), and the connection electrode may be provided in the fourth conductive layer. This enables to further enhance the resolution of the display screen.

In the mode (1), the array substrate may include a plurality of portions not including the first insulating layer and the second insulating layer on the wiring (common trunk wiring), the portion not including the third insulating layer may spread in a belt-like form above the wiring, (common trunk wiring), in a plan view of the array substrate, the plurality of portions not including the first insulating layer and the second insulating layer and a part of the electrode (common electrode) may be positioned in the portion not including the third insulating layer, and the connection electrode may be provided in the fourth conductive layer. This enables to increase the area of the connecting portion between the connection electrode and common electrode. Thus, the contact resistance between the electrodes is reduced and a connection failure between the electrodes is suppressed.

The connection electrode may include a lower portion provided in the second conductive layer and an upper portion provided in the fourth conductive layer, the array substrate may include a portion not including the first insulating layer on the wiring (common trunk wiring) and a portion not including the second insulating layer and the third insulating layer on the lower portion, the lower portion may be connected to the wiring (common trunk wiring) through the portion not including the first insulating layer, and the upper portion may be connected to the lower portion through the portion not including the second insulating layer and the third insulating layer. This enables the lower portion of the connection electrode to protect the common trunk wiring during the etching for forming the third conductive layer. Accordingly, choices are increased in the material of the third conductive layer, the etchant for forming the third conductive layer, and the material of the first conductive layer.

The array substrate may include a portion not including the first insulating layer, the second insulating layer, and the third insulating layer on the wiring, (common trunk wiring), and the connection electrode may be provided in the fourth conductive layer and connected to the wiring (common trunk wiring) through the portion not including the first insulating layer, the second insulating layer, and the third insulating layer. This enables to further enhance the resolution of the display screen.

The portion not including the first insulating layer, the second insulating layer, and/or the third insulating layer may be, for example, a closed portion (e.g., opening section) or a non-closed portion (e.g., cut-out portion, a portion outside the insulating layer). Alternatively, the opening section may be a so-called contact hole.

The third and fourth conductive layers are preferably transparent conductive layers. In such a case, two transparent electrodes can form a storage capacitor to enhance the aperture ratio.

Preferably, the array substrate includes a thin film transistor, the thin film transistor includes a semiconductor layer, and the semiconductor layer includes an oxide semiconductor. In a case where a semiconductor layer of a TFT is formed using an oxide semiconductor, in the production process, an element for preventing electrostatic discharge (ESD) commonly formed on the array substrate needs to be larger compared to cases where other semiconductor materials (e.g., amorphous silicon) are used. In the liquid crystal display according to the present invention, however, the flame region of the array substrate can be narrowed. Accordingly, the liquid crystal display according to the present invention is particularly suitable in the case of producing a semiconductor layer of a TFT from an oxide semiconductor.

Preferably, the second insulating layer includes an organic insulating layer. This enables to easily increase the thickness of the second insulating layer. Thus, the parasitic capacitance is decreased to suppress occurrence of defective display.

Preferably, the second insulating layer includes an inorganic insulating layer, and the organic insulating layer is stacked on the inorganic insulating layer. This enables to both ensure the thickness of the second insulating layer and the reliability of the switching element (e.g., TFT).

Preferably, the second insulating layer includes a layer etchable with an etchant, and the third insulating layer includes a layer etchable with the same etchant. The second insulating layer and the third insulating layer may include a layer formed from the same material. The second and third insulating layers each including a layer that is etchable with the same etchant enable to easily patterning an insulating film for the third insulating layer and an insulating film for the second insulating layer in the same step. The etchant may be gaseous or liquid.

Preferably, the first insulating layer includes a lower layer and an upper layer stacked on the lower layer. This enables to provide a gate insulating film of the TFT in the lower layer and a channel protective layer of the TFT in the upper layer in the display region. In addition, in a case where the semiconductor layer of the TFT is made of an oxide semiconductor, a channel protective layer is preferably provided from the standpoint of improving the properties of the TFT. Accordingly, the present embodiment is particularly preferable in the case of producing a semiconductor layer of a TFT from an oxide semiconductor.

Preferably, the lower layer and the upper layer cover the first conductive layer outside the region (display region). This enables to more surely protect the wiring (e.g., common trunk wiring) provided in the first conductive layer and to reduce the parasitic capacitance.

Advantageous Effects of Invention

The present invention enables to produce a liquid crystal display having a display screen with a high resolution and a narrowed flame portion in simplified production steps.

BRIEF DESCRIPTION OF DRAWINGS

FIG. 11 is a schematic plan view of an array substrate in a liquid crystal display of Embodiment 3 and shows a structure around a common trunk wiring.

FIG. 12 is a schematic cross-sectional view taken along the J-K line in FIG. 11.

DESCRIPTION OF EMBODIMENTS

The present invention is more specifically described with reference to drawings based on, but not limited to, embodiments.

(Embodiment 1)

Figure 1:
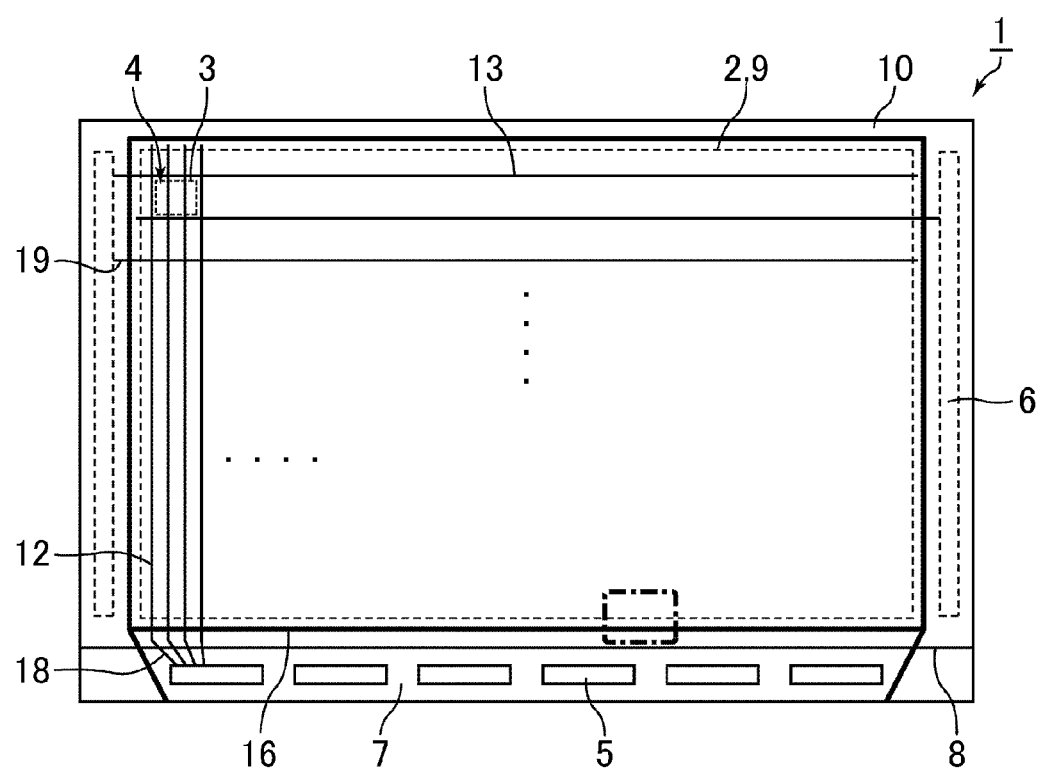
FIG. 1 is a schematic plan view of a liquid crystal panel in a liquid crystal display of Embodiment 1.

A liquid crystal display of Embodiment 1 is an active matrix-driving and transparent-type liquid crystal display. As shown in FIG. 1, the liquid crystal display is equipped with a liquid crystal panel 1, a back light unit (not shown) provided behind the liquid crystal panel 1, a control section (not shown) for driving and controlling the liquid crystal panel 1 and the back light unit, and a flexible substrate (not shown) connecting the liquid crystal panel 1 to the control section.

The liquid crystal display of the present embodiment includes a display portion 2 for displaying images. The display portion 2 includes a plurality of pixels 3 arranged in a matrix. Each pixel 3 consists of plural sub pixels 4 of different colors (e.g., three colors including red, green, and blue). It is to be noted that the liquid crystal display of the present embodiment may be a monochrome liquid crystal display. In such a case, each pixel 3 needs not to be divided into a plurality of sub pixels.

The pitches of pixels and sub pixels are not particularly limited. For example, the pitch of sub pixels may be 28 μm×84 μm. The interval between source bus lines 12 described later may be less than 20 μm.

The liquid crystal panel 1 includes an active matrix substrate (array substrate) 7, a counter substrate 8 that faces the array substrate 7 and has members such as a color filter and a black matrix, a liquid crystal layer (not shown) provided between the substrates 7 and 8, a first horizontal alignment film (not shown) provided on the surface of the array substrate 7 on the liquid crystal layer side, a second horizontal alignment film (not shown) provided on the surface of the counter substrate 8 on the liquid crystal layer side, and a driver chip 5 for a source bus line mounted on the array substrate 7. The array substrate 7 is provided on the rear side and the counter substrate 8 is provided on the viewer's side in the liquid crystal display. Each of the substrates 7 and 8 has a polarizer (not shown) attached to the surface on the side opposite to the liquid crystal layer side. These polarizers are commonly arranged in crossed Nicols. The driver chip 5 is mounted in a region not facing the counter substrate 8 of the array substrate 7, namely in a region protruding from the counter substrate 8 (hereafter, also referred to as a projecting region) by the COG (Chip On Glass) technique.

The array substrate 7 includes a region (display region) 9 corresponding to the display portion 2 and a region (flame region) 10 surrounding the display region 9. The array substrate 7 has driver circuits 6 for a gate bus line formed monolithically on the right and left sides of the display region 9, a plurality of terminals (not shown, hereafter, also referred to as array terminals) formed in the projecting region, source bus lines 12 and gate bus lines 13 formed in the display region 9, lead wires 18 for the source bus lines and lead wires 19 for the gate bus lines formed in the flame region 10, a common trunk wiring 16 formed in the flame region 10 to surround the display region 9, and a plurality of input wirings (not shown) each formed in the flame region 10. The source bus lines 12 and the gate bus lines 13 cross each other and are arranged in a grid pattern. The gate bus lines 13 include those connected to the driver circuit 6 on the right side and those connected to the driver circuit 6 on the left side. These are arranged alternately. The array terminals include terminals connected to the output terminal of the driver chip 5 (hereafter, also referred to as first array terminals), terminals connected to the input terminal of the driver chip 5 (hereafter, also referred to as second array terminals), and terminals connected to the terminal of the flexible substrate (hereafter, also referred to as third array terminals). Each lead wire 18 connects the corresponding source bus line 12 to the first array terminal. Each lead wire 19 connects the corresponding gate bus line 13 to the output portion of the driver circuit 6. The common trunk wiring 16 is connected to the third array terminal. To the common trunk wiring 16, a common signal is transmitted from the control section via the flexible substrate. The common signal refers to a signal applied to all the pixels. Each input wiring connects the second array terminal or the input portion of the driver circuit 6 to the third array terminal. Instead of the driver circuit 6 formed monolithically, a driver chip having the same function may be mounted on the array substrate 7

Figure 2:
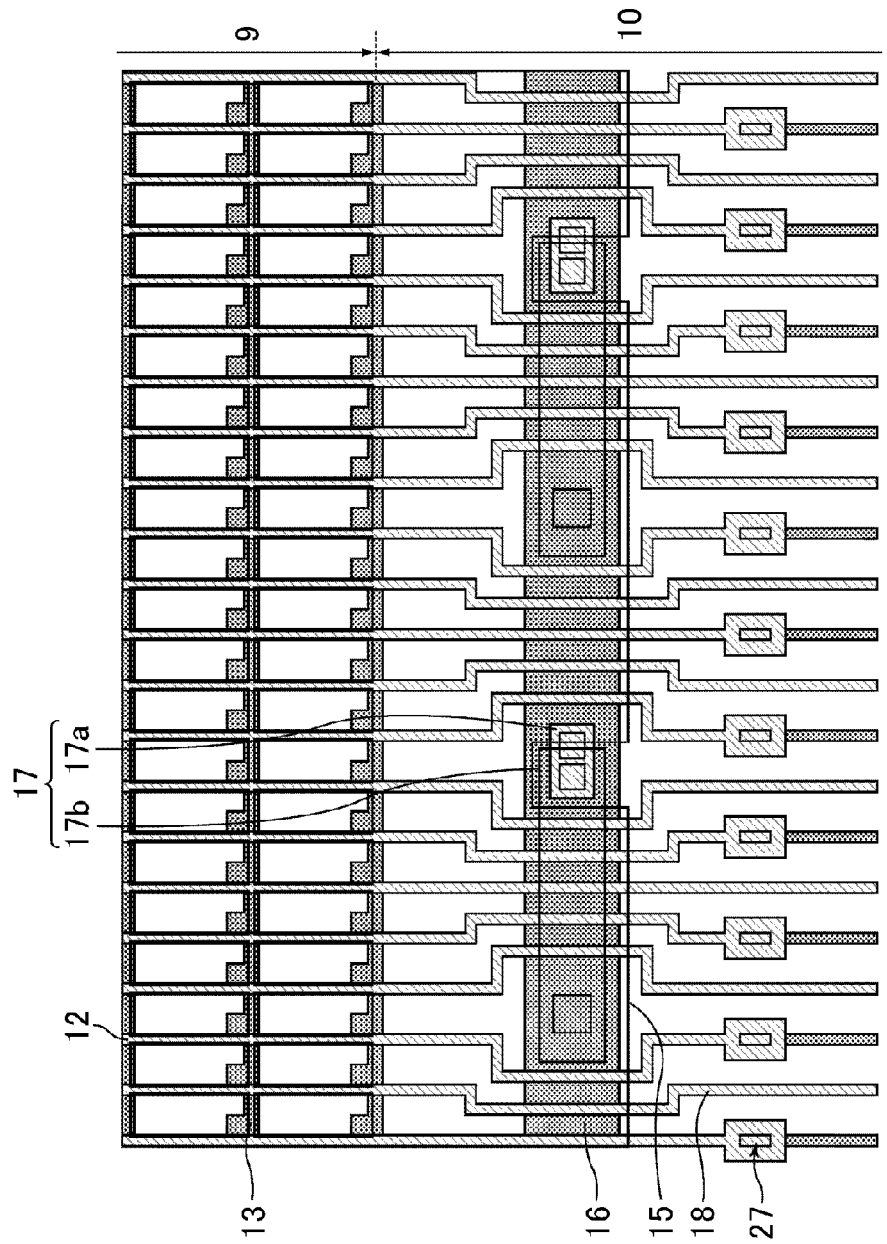
FIG. 2 is an enlarged schematic plan view of an array substrate in the liquid crystal display of Embodiment 1 and shows a region surrounded by a dashed line in FIG. 1.

As shown in FIG. 2, regions defined by the source bus lines 12 and gate bus lines 13 (hereafter, also referred to as sub-pixel regions) correspond to the sub pixels. The array substrate 7 has a common electrode 15 formed to cover the display region 9 and a connection electrode 17 formed on the common trunk wiring 16. The connection electrode 17 includes a lower portion 17a and an upper portion 17b. In the flame region 10, the common electrode 15 is connected to the common trunk wiring 16 via the connection electrode 17. Each lead wire 18 passes above the common trunk wiring 16 to cross the common trunk wiring 16. In addition, part of the lead wires 18 detours around the lower portion 17a.

Figure 3:
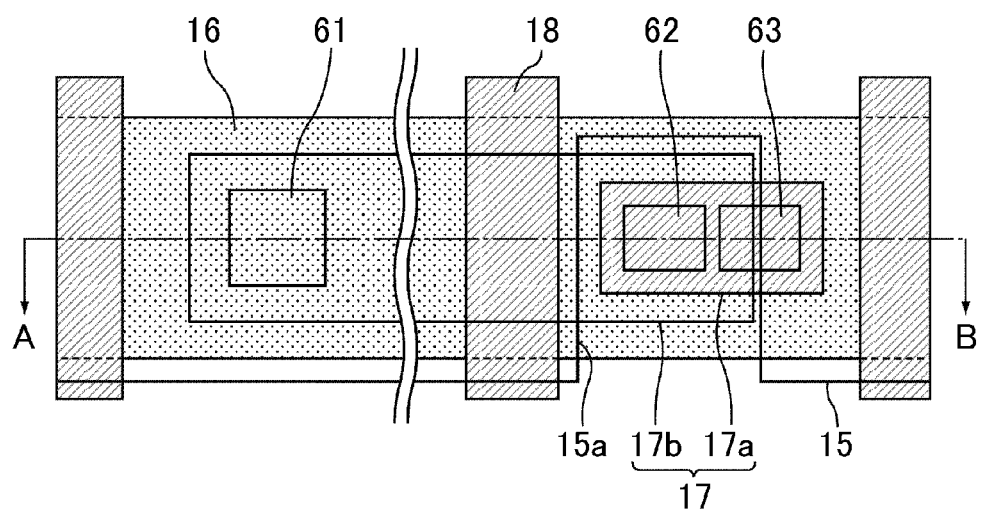
FIG. 3 is a schematic plan view of the array substrate in the liquid crystal display of Embodiment 1 and shows a structure around the common trunk wiring.
Figure 4:
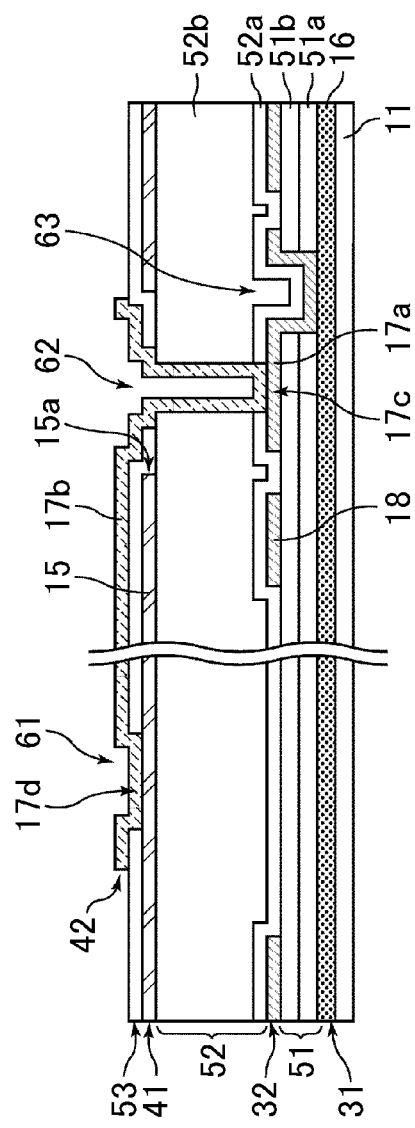
FIG. 4 is a schematic cross-sectional view taken along the A-B ling in FIG. 3.

With reference to FIGS. 3 and 4, a detailed description is given on the structure around the common trunk wiring 16.

The array substrate 7 has a transparent insulating substrate 11. On the insulating substrate 11 are stacked a first wiring layer 31 corresponding to the first conductive layer, a first insulating layer 51, a second wiring layer 32 corresponding to the second conductive layer, a second insulating layer 52, a first transparent conductive layer 41 corresponding to the third conductive layer, a third insulating layer 53, and a second transparent conductive layer 42 corresponding to the fourth conductive layer in the stated order. The first insulating layer 51 includes a lower layer 51a and an upper layer 51b stacked on the lower layer 51a. The second insulating layer 52 includes a lower layer 52a and an upper layer 52b stacked on the lower layer 52a. The first insulating layer 51, the second insulating layer 52, and the third insulating layer 53 each function as an interlayer insulating film near the common trunk wiring 16.

The common trunk wiring 16 is formed in the first wiring layer 31. The lead wire 18 is formed in the second wiring layer 32 above the common trunk wiring 16. The lower portion 17a is formed in the second wiring layer 32. The upper portion 17b is formed in the second transparent conductive layer 42. The common electrode 15 is formed in the first transparent conductive layer 41. The lower portion 17a is provided between two adjacent lead wires 18. The upper portion 17b is provided to cross a plurality of lead wires 18.

The third insulating layer 53 has a contact hole 61 formed therein above the common electrode 15. The second insulating layer 52 and the third insulating layer 53 have a contact hole 62 formed therein on the lower portion 17a. The common electrode 15 has a cut-out portion 15a so as not to overlap with the contact hole 62. The first insulating layer 51 has a contact hole 63 formed therein on the common trunk wiring 16. The contact hole 63 is provided between two adjacent lead wires 18.

The upper portion 17b is connected to the common electrode 15 through the contact hole 61 and connected to the lower portion 17a through the contact hole 62. The lower portion 17a is connected to the common trunk wiring 16 through the contact hole 63. The common electrode 15 is thus connected to the common trunk wiring 16 via the connection electrode 17 in the flame region 10, and a common signal is supplied from the common trunk wiring 16 to the common electrode 15.

As shown in FIG. 1, in a case where the driver circuit 6 is monolithically formed on the array substrate 7, the output portion of the driver circuit 6 is provided in the second wiring layer 32 and outputs an output signal. The lead wire 19 connecting the gate bus line 13 to the output portion of the driver circuit 6 therefore includes a portion that is provided in the second wiring layer 32 and connected to the output portion, and a portion that is provided in the first wiring layer 31 and connected to the gate bus line 13. These portions are connected to each other through a contact hole (not shown) formed in the first insulating layer 51 in a region between the common trunk wiring 16 and the display region 9. Thus, an output signal is supplied from the driver circuit 6 to the gate bus line 13 via the lead wire 19. Accordingly, also in the vicinity of the ends of the display region 9, excluding the lower end where the lead wire 18 is running, namely in the vicinity of the right and left ends of the display region 9 and the upper end (extension lines of the source bus line 12) of the display region 9, the common trunk wiring 16 can be formed in the first wiring layer 31. In a case where the driver chip, instead of the driver circuit 6, is mounted on the array substrate 7, the common trunk wiring 16 is formed in the second wiring layer 32 in the vicinity of the ends of the display region 9, excluding the lower end and the upper end where the lead wire 18 is running, namely in the vicinity of the right and left ends of the display region 9. This enables integral formation of the lead wire 19 and the gate bus line 13 without using a contact hole in the first wiring layer 31. Near the four corners of the display region 9, the common trunk wiring 16 running in the first wiring layer 31 comes into the second wiring layer 32 through a contact hole (not shown) formed in the first insulating layer 51. Under the common trunk wiring 16 formed in the second wiring layer 32, the lead wire 19 for the gate bus line 13 formed in the first wiring layer 31 is running. The common electrode 15 is connected to the portion of the common trunk wiring 16 formed in the second wiring layer 32, via another connection electrode (not shown) formed in the second transparent conductive layer 42.

Next, a description is given on the structure of the sub-pixel area of the array substrate 7.

Figure 5:
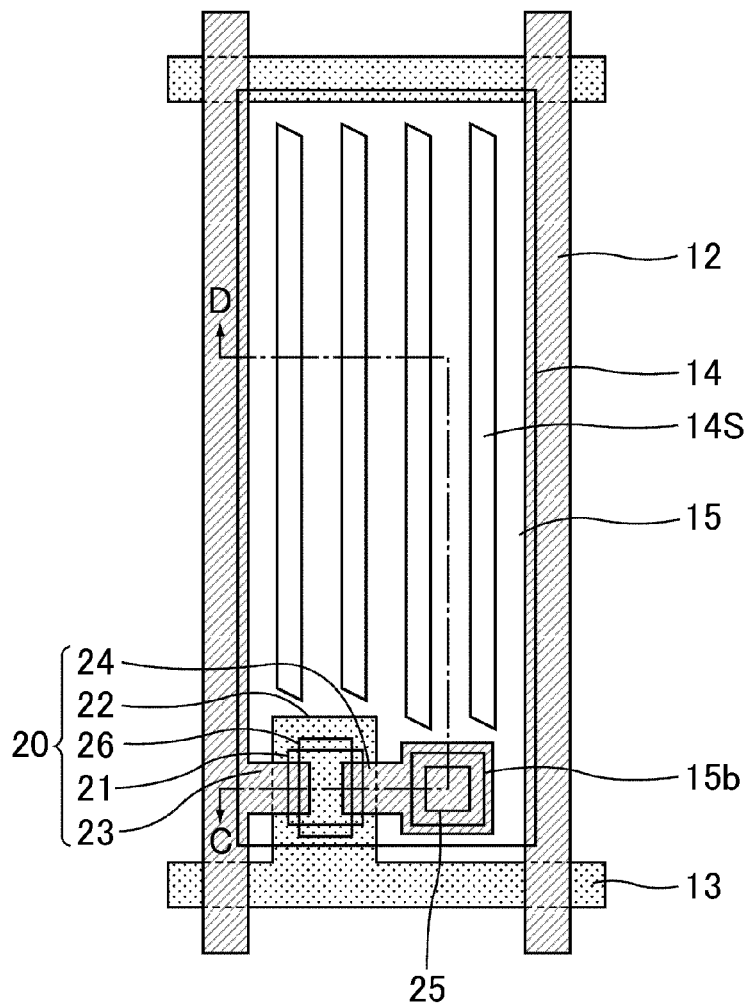
FIG. 5 is a schematic plan view of the array substrate in the liquid crystal display of Embodiment 1 and shows a structure of a sub-pixel area.
Figure 6:
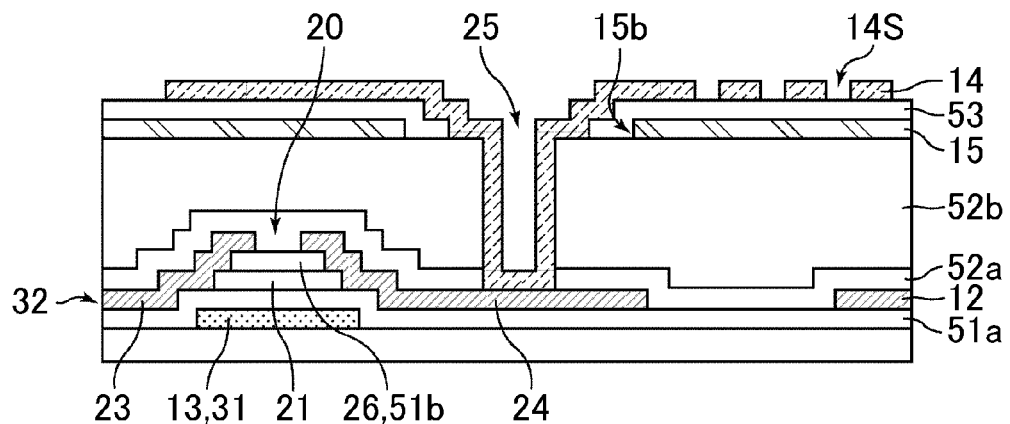
FIG. 6 is a schematic cross-sectional view taken along the C-D line in FIG. 5.

As shown in FIGS. 5 and 6, the array substrate 7 has a TFT 20 connected to the source bus line 12 and the gate bus line 13, and a pixel electrode 14 connected to the TFT 20. The pixel electrode 14 has slits 14S that are running in parallel with one another. In other words, the pixel electrode 14 has linear portions running in parallel with one another. The common electrode 15 is formed to cover all the sub-pixel areas. The pixel electrode 14 is formed in the second transparent conductive layer 42 and provided on the common electrode 15 with the third insulating layer 53 interposed therebetween. The gate bus line 13 is formed in the first wiring layer 31. The source bus line 12 is formed in the second wiring layer 32.

Liquid crystal molecules (commonly, nematic liquid crystal) in the liquid crystal layer are aligned in a direction at a predetermined angle relative to the slits 14S and in parallel with the surfaces of the substrates 7 and 8 when no voltage is applied.

The TFT 20 functions as a switching element and includes a semiconductor layer 21, a channel protective layer 26, a gate electrode 22, a source electrode 23, and a drain electrode 24. The gate electrode 22 is formed integrally with the gate bus line 13 so as to be connected to the gate bus line 13. The source electrode 23 is formed integrally with the source bus line 12 so as to be connected to the source bus line 12. The drain electrode 24 is connected to the pixel electrode 14. The source electrode 23 and the drain electrode 24 each are connected to the semiconductor layer 21. When the TFT 20 is turned ON, a channel is formed in the semiconductor layer 21. The channel protective layer 26 is formed on the semiconductor layer 21, and protects the channel from an etchant upon patterning of the source electrode 23 and the drain electrode 24. The channel protective layer 26 is formed in the upper layer 51b of the first insulating layer 51. The lower layer 51a of the first insulating layer 51 is interposed between the gate electrode 22 and the semiconductor layer 21, and functions as a gate insulating film of the TFT 20. The lower layer 52a of the second insulating layer 52 functions as a passivation film. The upper layer 52b of the second insulating layer 52 functions as a planarizing film. The drain electrode 24 is formed in the second wiring layer 32. The pixel electrode 14 is connected to the drain electrode 24 through a contact hole 25 penetrating through the second insulating layer 52 and the third insulating layer 53. An opening 15b is formed in the common electrode 15 so that the common electrode 15 does not overlap with the contact hole 25.

To the pixel electrode 14, an image signal is applied from the source bus line 12 via the TFT 20. To the common electrode 15, a common signal is applied. When an image signal is applied to the pixel electrode 14, lines of electric force radially generates between the pixel electrode 14 and the common electrode 15 and a fringe electric field corresponding to the image signal generates in the liquid crystal layer. The fringe electric field controls the alignment of liquid crystal molecules (commonly having positive dielectric anisotropy). As described above, the common electrode 15 forms a pair with the pixel electrode 14 and functions as a counter electrode to drive the liquid crystal layer.

The pixel electrode 14 overlaps with the common electrode 15. Between the electrodes 14 and 15, the third insulating layer 53 is interposed. Additionally, a common signal is applied to the common electrode 15. Accordingly, when an image signal is applied to the pixel electrode 14, these transparent members form a storage capacitor. As mentioned above, the pixel electrode 14 and the common electrode 15 also function as electrodes for a storage capacitor. The third insulating layer 53 functions as a passivation film and as a dielectric body of the storage capacitor in the sub-pixel area.

Next, a description is given on the production method of the liquid crystal display of the present embodiment. First, the production step of the array substrate 7 is described.

First, an insulating substrate 11 is provided and the following steps of (1) to (7) are carried out. Specific examples of the insulating substrate 11 include a glass substrate and a plastic substrate.

(1) Step of Forming First Wiring Layer

A first conductive film is formed on the insulating substrate 11 by a method like spattering or vacuum evaporation. The first conductive film may be formed from, for example, molybdenum (Mo), titanium (Ti), aluminum (Al), copper (Cu), or an alloy of these. The first conductive film may be a multilayer film consisting of films formed from the above materials. Next, patterning of the first conductive film is performed by photolithography, thereby forming the first wiring layer 31 including the common trunk wiring 16, the gate bus lines 13, the input wiring, and the like.

(2) Step of Forming First Insulating Layer and Semiconductor Layer

Next, a first insulating film is formed by a method like CVD or spattering. Specific examples of the first insulating film include a silicon nitride film, a silicon oxide film, and a multilayer film including these films. After formation of the first insulating film, a semiconductor film is formed by a method like CVD or spattering. The semiconductor film may be formed from, for example, a semiconductor of a group 14 element (e.g., silicon) or an oxide semiconductor. In particular, the oxide semiconductor is preferable. The oxide semiconductor preferably contains oxygen (O) and at least one element selected from the group consisting of indium (In), gallium (Ga), zinc (Zn), aluminum (Al), and silicon (Si). More preferably, the oxide semiconductor contains In, Ga, Zn, and O. Then, the semiconductor film is subjected to patterning by photolithography to provide a semiconductor layer 21. The crystallizability of the semiconductor layer 21 is not particularly limited. The semiconductor layer 21 may have a single crystal structure, polycrystalline structure, amorphous structure, or fine crystal structure. Moreover, the semiconductor layer may have two or more kinds of these crystalline structures in combination. Next, a second insulating film is formed by a method like CVD or spattering. Specific examples of the second insulating film include a silicon nitride film, a silicon oxide film, and a multilayer film including these films. Next, patterning of the first and second insulating films is performed by photolithography, thereby forming the first insulating layer 51 including the lower layer 51a and the upper layer 51b. Additionally, the channel protective layer 26 and the contact hole 63 are formed.

In the present embodiment, the upper layer 51b of the first insulating layer 51 may be omitted. In a case where an oxide semiconductor is used as a material of the semiconductor layer 21 of the TFT 20, it is preferable to provide the upper layer 51b and form the channel protective layer 26 from the standpoint of improving the properties of the TFT 20. In a case where the upper layer 51b is provided, two layers including the lower layer 51a and the upper layer 51b can cover the first wiring layer 31 in the flame region 10. This enables to more surely protect the wiring of the first wiring layer 31 and to reduce the parasitic capacitance.

(3) Step of Forming Second Wiring Layer

Next, a second conductive film is formed by a method like spattering or vacuum evaporation. The second conductive film may be formed from, for example, Mo, Ti, Al, Cu, or an alloy of these. The second conductive film may be a multilayer film including films of these materials. Then, patterning of the second conductive film is performed by photolithography, thereby forming the second wiring layer 32 including the lead wires 18, the source bus lines 12, the lower portion 17a, and the like.

(4) Step of Forming Upper Layer of Second Insulating Layer

Then, a third insulating film is formed by a method like CVD or spattering. Specific examples of the third insulating film include a silicon nitride film, a silicon oxide film, a multilayer film including these films. Next, a fourth insulating film is formed by a method like spin coating or slit coating. The fourth insulating film is formed from preferably an organic material, particularly preferably a photosensitive resin such as photosensitive acrylic resins. Patterning of the fourth insulating film is performed by photolithography, thereby forming the upper layer 52b of the second insulating layer 52. In regions where the contact holes 62 and the contact holes 25 are to be formed, the fourth insulating film is removed. Formation of the fourth insulating film from an organic material enables to easily increase the thickness of the second insulating layer 52. Accordingly, the parasitic capacitance between the common electrode 15 and the wiring formed in the second wiring layer 32 (e.g., source bus line 12) can be reduced, so that occurrence of defective display is suppressed. The use of a photosensitive resin as a material of the fourth insulating film enables to complete patterning of the fourth insulating film only by exposure treatment and development treatment.

(5) Step of Forming First Transparent Conductive Layer

Next, a first transparent conductive film is formed by spattering. The first transparent conductive film may be formed, for example, from indium tin oxide (ITO), indium zinc oxide (IZO), or the like. Then, patterning of the first transparent conductive film is performed by photolithography, thereby forming the first transparent conductive layer 41 including the common electrode 15 and the like.

(6) Step of Forming Lower Layer of the Second Insulating Layer and Third Insulating Layer A fifth insulating film is then formed by a method like CVD or spattering. Specific examples of the fifth insulating film include a silicon nitride film, a silicon oxide film, and a multilayer film of these films. Then, patterning of the third insulating film and the fifth insulating film is performed in the same step by photolithography, thereby forming the lower layer 52a of the second insulating layer 52 and the third insulating layer 53. In this step, the third insulating film and the fifth insulating film are continuously etched with the same etchant. In regions where the contact holes 62 and the contact holes 25 are to be formed, the third insulating film is removed. In regions where the contact holes 61 and the contact holes 25 are to be formed, the fifth insulating film is removed. At this point, the contact holes 62 and 25 are completed. In a case where layers included in the second insulating layer 52 and the third insulating layer 53 are etchable with the same etchant, the third insulating film and the fifth insulating film can be easily patterned in the same step.

In the present embodiment, the contact holes 61 are not formed above the lead wire 18. Accordingly, even in a case where the common electrode 15 has pinholes inside the contact holes 61, the etchant for the fifth insulating film is effectively prevented from passing through the pinholes to cause unintended etching of the second insulating layer 52 and the lead wire 18.

In the present embodiment, the upper layer 52b of the second insulating layer 52 maybe omitted. In such a case, the thickness of the lower layer 52a is greater compared to that in the case where the upper layer 52b is not omitted. If the thickness of the second insulating layer 52 is small, the parasitic capacitance formed between the common electrode 15 and the wiring (e.g., source bus line 12) formed in the second wiring layer 32 increases, possibly causing occurrence of defective display. In a case only the lower layer 52a is formed, the time for forming the third insulating film is commonly longer. Accordingly, the upper layer 52b is preferably formed from the standpoint of reducing the time. The second insulating layer 52 may be formed only of an organic insulating film. In such a case, the thickness of the second insulating layer 52 can be easily increased. However, the organic insulating film is formed directly on the TFT 20, which may impair the reliability of the TFT 20. In contrast, forming the lower layer 52a of the second insulating layer 52 from an inorganic insulating material (e.g., silicon nitride, silicon oxide) enables to prevent lowering of the reliability of the TFT 20. Accordingly, from the standpoint of easily achieving both ensuring the thickness of the second insulating layer 52 and ensuring the reliability of the TFT 20, the second insulating layer 52 preferably includes an inorganic insulating layer and an organic insulating layer stacked on the inorganic insulating layer.

(7) Step of Forming Second Transparent Conductive Layer

Next, a second transparent conductive film is formed by spattering. The second transparent conductive film may be formed, for example, from ITO, IZO, or the like. Then, patterning of the second transparent conductive film is performed by photolithography, thereby forming a second transparent conductive layer 42 including the pixel electrode 14, the upper portion 17b, and the like.

Subsequently, in the step of cell assembly, a horizontal alignment film containing an organic resin (e.g., polyimide) is formed by applying a material on the surface of each of the array substrate 7 and a counter substrate 8 that is separately provided. Then, each alignment film is subjected to alignment treatment by a method like rubbing treatment or photoalignment treatment, so that the initial alignment of liquid crystal molecules is set in a predetermined direction.

Next, a sealing material is applied on either the array substrate 7 or the counter substrate 8 to surround the display region. The array substrate 7 and the counter substrate 8 are stacked with each other in such a manner that the alignment films thereof face each other. The substrates are bonded to each other using the applied sealing material. Cylindrical spacers are formed in advance on either the array substrate 7 or the counter substrate 8 so that the cell gap can be maintained. As a result, a gap (cell gap) of about several micrometers is formed between the substrates. Then, a liquid crystal material is enclosed in the space surrounded by the sealing material to form a liquid crystal layer.

On both surfaces of thus formed liquid crystal cell, a polarizer and a phase plate (option) are attached, and then, the driver chip 5 is mounted. Thus, the liquid crystal panel 1 is provided.

Then, the liquid crystal panel 1 is connected with the flexible substrate, and the control section and the back light unit are mounted thereon. The resulting assembly is stored in a casing. Thus, the liquid crystal display of Embodiment 1 is completed.

In the present embodiment, the common trunk wiring 16 is formed in the first wiring layer 31 and the lead wires 18 are formed in the second wiring layer 32. No contact hole for passing each lead wire 18 into the lower wiring layer is therefore needed between the source bus lines 12 formed in the second wiring layer 32 and the common trunk wiring 16. Even in a case where the pitch between the source bus lines 12 is narrowed for enhancing the resolution of a display screen, the common trunk wiring 16 can be arranged to cross the lead wires 18 and an input path of a common signal to the common electrode 15 is secured in a region where the common trunk wiring 16 are crossing the lead wires 18. In addition, since there is no need to form a contact hole to pass each lead wire 18 to another layer, the distance between the display region 9 and the common trunk wiring 16 can be narrowed, thereby enabling to narrow the flame region 10.

In the present embodiment, the contact hole 61 and the contact hole 62 are positioned with one or more lead wires 18 interposed therebetween. In other words, as shown in FIG. 4, a connecting portion 17c between the connection electrode 17 and the common trunk wiring 16 and a connecting portion 17d between the connection electrode 17 and the common electrode 15 are not provided in the region between the same two lead wires 18. This enables to further enhance the resolution of the display screen. Moreover, since the sizes of the contact holes 61, 62, and 63 are surely large enough, occurrence of a defective contact is prevented, so that a common signal is stably supplied to the common electrode 15. As a result, occurrence of display failures (e.g., shadowing, flicker) can be prevented.

Figure 7:
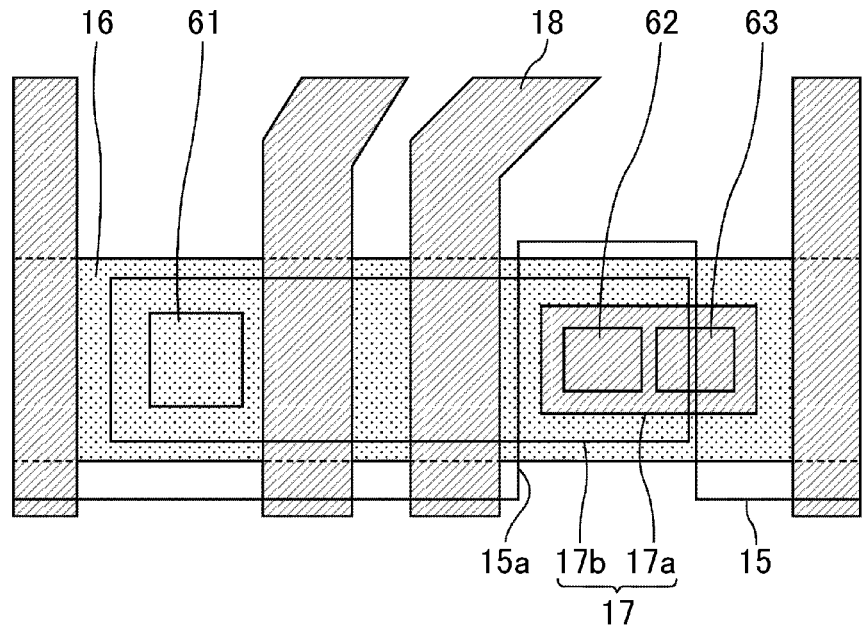
FIG. 7 is a schematic plan view of the array substrate in the liquid crystal display of Embodiment 1 and shows a structure around the common trunk wiring.
Figure 8:
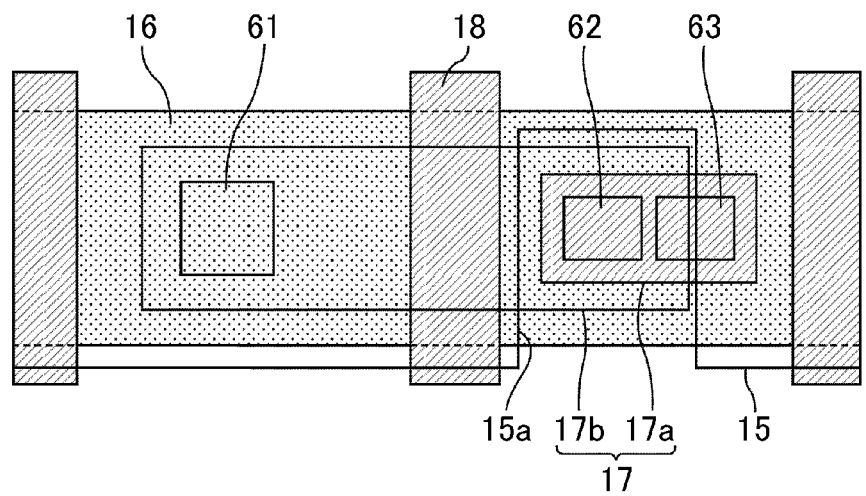
FIG. 8 is a schematic plan view of the array substrate in the liquid crystal display of Embodiment 1 and shows a structure around the common trunk wiring.

In the present embodiment, the number of the lead wires 18 positioned between the contact hole 61 and the contact hole 62 is not particularly limited, and it may be two as shown in FIG. 7 or 1 as shown in FIG. 8.

Here, it may be considered that the position of the common trunk wiring 16 is not set in the region where the lead wire 18 for the source bus line 12 is running as shown in FIGS. 3 to 6 of Patent Literature 2. In such a case, however, the electric potential is not stable in the common electrode 15, so that display failures (e.g., shadowing, flicker) may be caused. The reason for this is that the common electrode 15 is formed from a transparent conductive film of comparatively high electric resistance. In contrast, in the present embodiment, as described above, the input path for supplying a common signal to the common electrode 15 is secured in the region where the common trunk wiring 16 are crossing the lead wire 18 for the source bus line 12. Accordingly, a common signal is stably supplied to the common electrode 15, thereby preventing occurrence of display failures (e.g., shadowing, flicker).

In a case where the semiconductor layer 21 is formed from an oxide semiconductor, the size of an element as a measure against electrostatic discharge (ESD) commonly formed on the array substrate in the production process needs to be larger compared to cases using other semiconductor materials (e.g., amorphous silicon). In the present embodiment, however, the flame region 10 of the array substrate 7 can be narrowed. Accordingly, the liquid crystal display of the present embodiment is particularly suitable for a case where an oxide semiconductor is used to form the semiconductor layer 21 of the TFT 20.

In the present embodiment, since the connection electrode 17 includes the lower portion 17a, upon performing etching for forming the first transparent conductive layer 41, the common trunk wiring 16 can be protected with the lower portion 17a of the connection electrode 17. This can increase choices in the material of the first transparent conductive layer 41, the etchant for forming the first transparent conductive layer 41, and the material of the first wiring layer 31.

In the present embodiment, as shown in FIG. 2, every other lead wires 18 are passed through the contact hole 27 to the first wiring layer in the region outside the common trunk wiring 16. The lead wire 18 in the first wiring layer 31 and the lead wire 18 in the second wiring layer 32 are alternately arranged. This can significantly reduce the interval between the lead wires 18. It is to be noted that the contact hole 27 is formed in the first insulating layer 51.

(Embodiment 2)

A liquid crystal display of Embodiment 2 is substantially the same as the liquid crystal display of Embodiment 1, except that the structure around the common trunk wiring is different.

Figure 9:
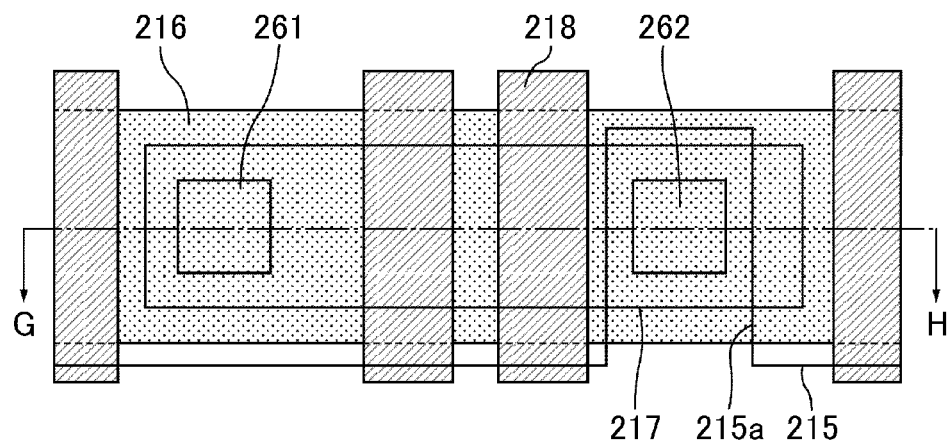
FIG. 9 is a schematic plan view of an array substrate in a liquid crystal display of Embodiment 2 and shows a structure around a common trunk wiring.
Figure 10:
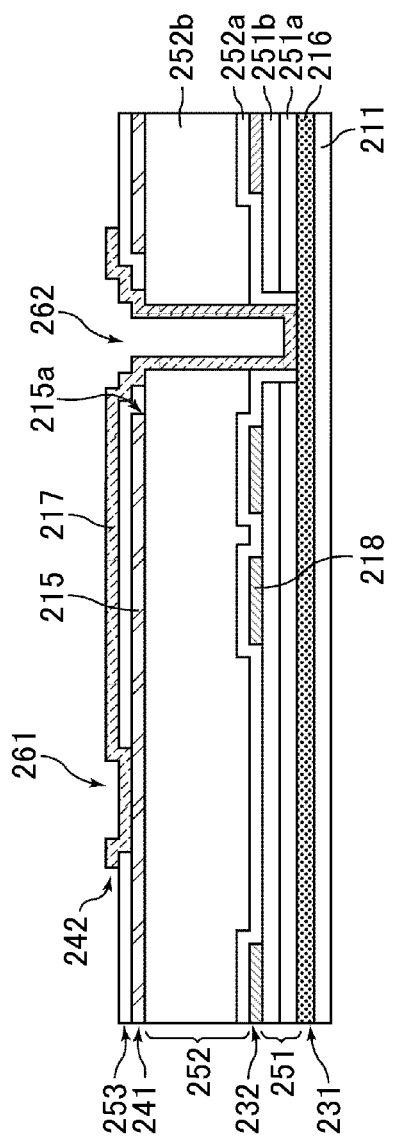
FIG. 10 is a schematic cross-sectional view taken along the G-H line in FIG. 9.

An array substrate included in the liquid crystal display of the present embodiment has a transparent insulating substrate 211 as shown in FIGS. 9 and 10. On the insulating substrate 211 are stacked a first wiring layer 231 corresponding to the first conductive layer, a first insulating layer 251, a second wiring layer 232 corresponding to the second conductive layer, a second insulating layer 252, a first transparent conductive layer 241 corresponding to the third conductive layer, a third insulating layer 253, and a second transparent conductive layer 242 corresponding to the fourth conductive layer in the stated order. The first insulating layer 251 includes a lower layer 251a and an upper layer 251b stacked on the lower layer 251a. The second insulating layer 252 includes a lower layer 252a and an upper layer 252b stacked on the lower layer 252a.

The array substrate according to the present embodiment has a common trunk wiring 216 formed in the first wiring layer 231, lead wires 218 formed in the second wiring layer 232 above the common trunk wiring 216, a connection electrode 217 formed in the second transparent conductive layer 242, and a common electrode 215 formed in the first transparent conductive layer 241. The connection electrode 217 is provided to cross the plural lead wires 218.

The third insulating layer 253 has a contact hole 261 formed therein on a common electrode 215. The first insulating layer 251, the second insulating layer 252, and the third insulating layer 253 have a contact hole 262 formed therein on the common trunk wiring 216. The common electrode 215 has a cut-out portion 215a so as not to overlap with the contact hole 262.

The connection electrode 217 is connected to the common electrode 215 through the contact hole 261 and also connected to the common trunk wiring 216 through the contact hole 262. The common electrode 215 is thus connected to the common trunk wiring 216 via the connection electrode 217 in the flame region, so that a common signal is supplied to the common electrode 215 from the common trunk wiring 216.

The liquid crystal display of the present embodiment, except for the array substrate, can be produced by the method described in Embodiment 1. Moreover, the method of producing the array substrate according to the present embodiment is substantially the same as the method described in Embodiment 1 except for the following point. In the present embodiment, the first and second insulating films are not patterned after formation of the semiconductor layer but concurrently with patterning of the third and fifth insulating films.

According to the present embodiment, the lower portion 17a and the contact hole 63 provided in Embodiment 1 can be omitted. Accordingly, compared to Embodiment 1, a higher-resolution liquid crystal display can be achieved.

(Embodiment 3)

A liquid crystal display of Embodiment 3 is substantially the same as the liquid crystal display of Embodiment 1 except that the structure around the common trunk wiring is different.

As shown in FIGS. 11 and 12, the array substrate included in the liquid crystal display of the present embodiment has a transparent insulating substrate 311. On the insulating substrate 311 are stacked a first wiring layer 331 corresponding to the first conductive layer, a first insulating layer 351, a second wiring layer 332 corresponding to the second conductive layer, a second insulating layer 352, a first transparent conductive layer 341 corresponding to the third conductive layer, a third insulating layer 353, and a second transparent conductive layer 342 corresponding to the fourth conductive layer in the stated order. The first insulating layer 351 includes a lower layer 351a and an upper layer 351b stacked on the lower layer 351a. The second insulating layer 352 includes a lower layer 352a and an upper layer 352b stacked on the lower layer 352a.

The array substrate according to the present embodiment has a common trunk wiring 316 formed in the first wiring layer 331, lead wires 318 formed in the second wiring layer 332 above the common trunk wiring 316, a connection electrode 317, and a common electrode 315 formed in the first transparent conductive layer 341. The connection electrode 317 includes a lower portion 317a formed in the second wiring layer 332 and an upper portion 317b formed in the second transparent conductive layer 342. The lower portion 317a is provided between two adjacent lead wires 318. The upper portion 317b extends from the region above the lower portion 317a to a region above the lead wire adjacent to the lower portion 317a.

The third insulating layer 353 has a contact hole 361 formed therein on the common electrode 315. The second insulating layer 352 and the third insulating layer 353 have a contact hole 362 formed therein on the lower portion 317a. The common electrode 315 has a cut-out portion 315a so as not to overlap with the contact hole 362. The first insulating layer 351 has a contact hole 363 formed therein on the common trunk wiring 316. The contact hole 363 is provided between two adjacent lead wires 318.

The upper portion 317b is connected to the common electrode 315 through the contact hole 361 and also connected to the lower portion 317a through the contact hole 362. The lower portion 317a is connected to the common trunk wiring 316 through the contact hole 363. The common electrode 315 is thus connected to the common trunk wiring 316 via the connection electrode 317 in the flame region and a common signal is supplied from the common trunk wiring 316 to the common electrode 315.

The liquid crystal display of the present embodiment can be produced by the method described in Embodiment 1.

In the present embodiment, the contact hole 361 is provided above the lead wire 318, and therefore, there is no need to provide a space for forming the contact hole 361 between two adjacent lead wires 318. As a result, compared to Embodiment 1, a higher-resolution liquid crystal display can be achieved. In addition, the flexibility of design is enhanced.

(Embodiment 4)

A liquid crystal display of Embodiment 4 is substantially the same as the liquid crystal display of Embodiment 1, except that the structure around the common trunk wiring is different.

Figure 13:
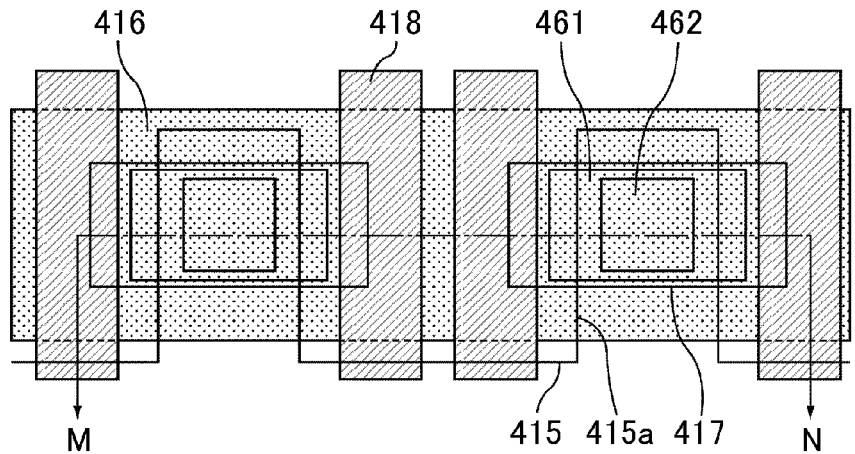
FIG. 13 is a schematic plan view of an array substrate in a liquid crystal display of Embodiment 4 and shows a structure around a common trunk wiring.
Figure 14:
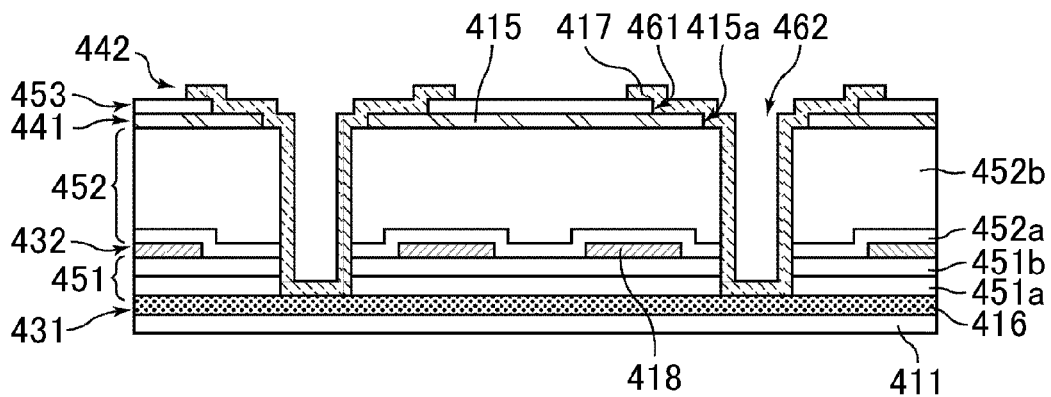
FIG. 14 is a schematic cross-sectional view taken along the M-N line in FIG. 13.

As shown in FIGS. 13 and 14, an array substrate in the liquid crystal display of the present embodiment has a transparent insulating substrate 411. On the insulating substrate 411 are stacked a first wiring layer 431 corresponding to the first conductive layer, a first insulating layer 451, a second wiring layer 432 corresponding to the second conductive layer, a second insulating layer 452, a first transparent conductive layer 441 corresponding to the third conductive layer, a third insulating layer 453, and a second transparent conductive layer 442 corresponding to the fourth conductive layer in the stated order. The first insulating layer 451 includes a lower layer 451a and an upper layer 451b stacked on the lower layer 451a. The second insulating layer 452 includes a lower layer 452a and an upper layer 452b stacked on the lower layer 452a.

An array substrate according to the present embodiment has a common trunk wiring 416 formed in the first wiring layer 431, lead wires 418 formed in the second wiring layer 432 above the common trunk wiring 416, a connection electrode 417 formed in the second transparent conductive layer 442, and a common electrode 415 formed in the first transparent conductive layer 441. The connection electrode 417 extends from a region above one lead wire 418 to a region above the adjacent lead wire 418.

The first insulating layer 451 and the second insulating layer 452 have a contact hole 462 formed therein on the common trunk wiring 416. The common electrode 415 has a cut-out portion 415a formed therein so as not to overlap with the contact hole 462. The third insulating layer 453 has an opening 461 formed therein above the common trunk wiring 416. The opening 461 is formed at the same position as the contact hole 462 and is larger than the contact hole 426. Moreover, part of the opening 461 is positioned on the common electrode 415 and part of the common electrode 415 is not covered with the third insulating layer 453.

The connection electrode 417 is formed to cover the opening 461, thereby contacting the common electrode 415. The connection electrode 417 is thus connected to the common electrode 415. The connection electrode 417 is connected to the common trunk wiring 416 through the contact hole 462. The common electrode 415 is thus connected to the common trunk wiring 416 via the connection electrode 417 in the flame region and a common signal is supplied to the common electrode 415 from the common trunk wiring 416.

The liquid crystal display of the present embodiment can be produced by the method described in Embodiment 2.

According to the present embodiment, the lower portion 17a and the contact hole 63 provided in Embodiment 1 can be omitted. The opening 461 extends from a region above the contact hole 462 to a region above the common electrode 415. In other words, the third insulating layer 453 is not present between a connecting portion of the connection electrode 417 and the common trunk wiring 416 and a connecting portion of the connection electrode 417 and the common electrode 415. Accordingly, the both connecting portions can be positioned closely to each other. As a result, a higher-resolution liquid crystal display can be achieved compared to Embodiments 1 and 2

(Embodiment 5)

A liquid crystal display of Embodiment 5 is substantially the same as the liquid crystal display of Embodiment 1, except that the structure around the common trunk wiring is different.

Figure 15:
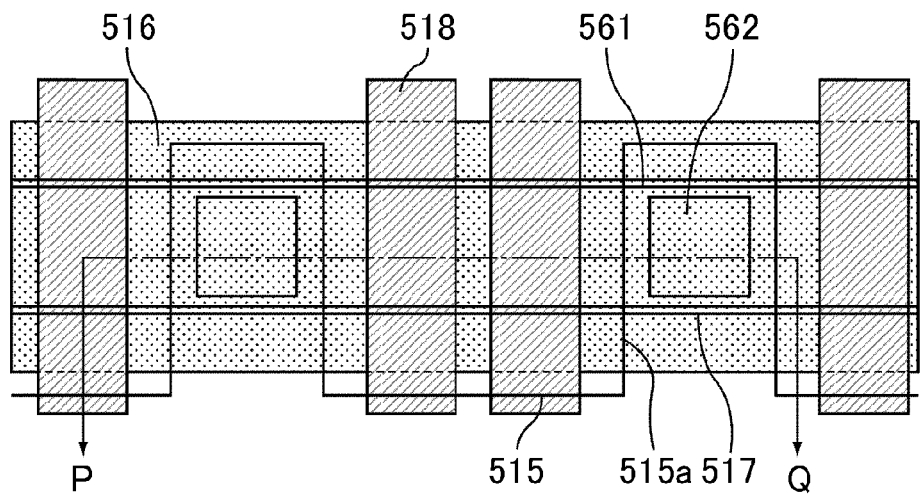
FIG. 15 is a schematic plan view of an array substrate in a liquid crystal display of Embodiment 5 and shows a structure around a common trunk wiring.
Figure 16:
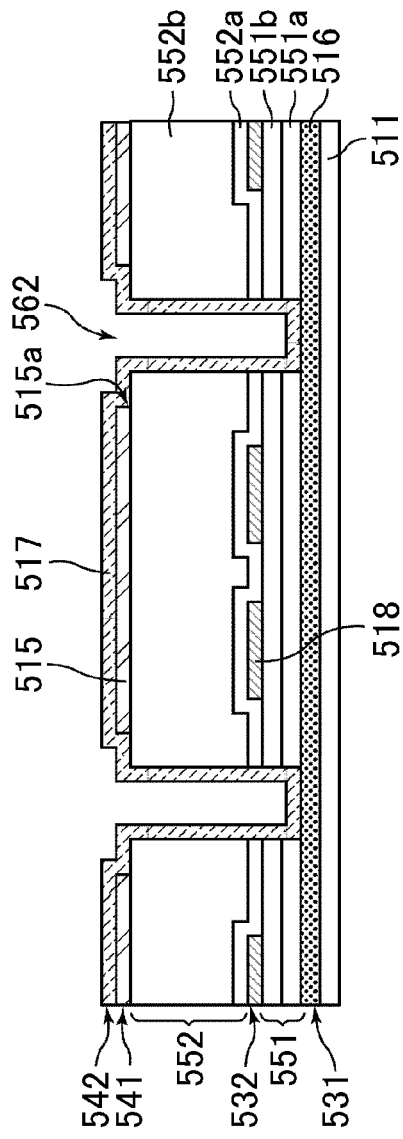
FIG. 16 is a schematic cross-sectional view taken along the P-Q line in FIG. 15.

As shown in FIGS. 15 and 16, an array substrate in the liquid crystal display of the present embodiment has a transparent insulating substrate 511. On the insulating substrate 511 are stacked a first wiring layer 531 corresponding to the first conductive layer, a first insulating layer 551, a second wiring layer 532 corresponding to the second conductive layer, a second insulating layer 552, a first transparent conductive layer 541 corresponding to the third conductive layer, a third insulating layer (not shown), and a second transparent conductive layer 542 corresponding to the fourth conductive layer in the stated order. The first insulating layer 551 includes a lower layer 551a and an upper layer 551b stacked on the lower layer 551a. The second insulating layer 552 includes a lower layer 552a and an upper layer 552b stacked on the lower layer 552a.

An array substrate according to the present embodiment has a common trunk wiring 516 formed in the first wiring layer 531, lead wires 518 formed in the second wiring layer 532 above the common trunk wiring 516, a connection electrode 517 formed in the second transparent conductive layer 542, and a common electrode 515 formed in the first transparent conductive layer 541. The connection electrode 517 is provided to cross a plurality of lead wires 518.

The first insulating layer 551 and the second insulating layer 552 have contact holes 562 formed therein on the common trunk wiring 516. One contact hole 562 is formed in each space between two adjacent lead wires 518. The common electrode 515 has a cut-out portion 515a formed therein so as not to overlap with the contact hole 562. The third insulating layer has a belt-shaped opening 561 above the common trunk wiring 516. In a plan view of the array substrate, a plurality of contact holes 562 are provided in the opening 561. In addition, part of the opening 561 is positioned on the common electrode 515.

The connection electrode 517 is formed to cover the opening 561, thereby contacting the common electrode 515. The connection electrode 517 is thus connected to the common electrode 515. The connection electrode 517 is connected to the common trunk wiring 516 through the contact hole 562. Thus, the common electrode 515 is connected to the common trunk wiring 516 via the connection electrode 517 in the flame region and a common signal is supplied to the common electrode 515 from the common trunk wiring 516.

The liquid crystal display of the present embodiment can be produced by the method described in Embodiment 2.

According to the present embodiment, the lower portion 17a and the contact hole 63 provided in Embodiment 1 can be omitted. The opening 561 extends in a belt-like form above the common trunk wiring 516. In a plan view of the array substrate, the contact hole 562 and part of the common electrode 515 are positioned inside the opening 561. In other words, the third insulating layer is not provided between a connecting portion of the connection electrode 517 and the common trunk wiring 516 and a connecting portion of the connection electrode 517 and the common electrode 515. Accordingly, the both connecting portions can be arranged closely to each other. As a result, compared to Embodiments 1 and 2, a higher-resolution liquid crystal display can be achieved.

The area of a connecting portion of the connection electrode 517 and the common electrode 515 can be increased. Accordingly, compared to Embodiments 1 to 4, the contact resistance between the both electrodes can be reduced and occurrence of connection failures between the electrodes can be prevented.

(Embodiment 6)

A liquid crystal display of Embodiment 6 is substantially the same as the liquid crystal display of Embodiment 1, except that the structure around the common trunk wiring is different.

Figure 17:
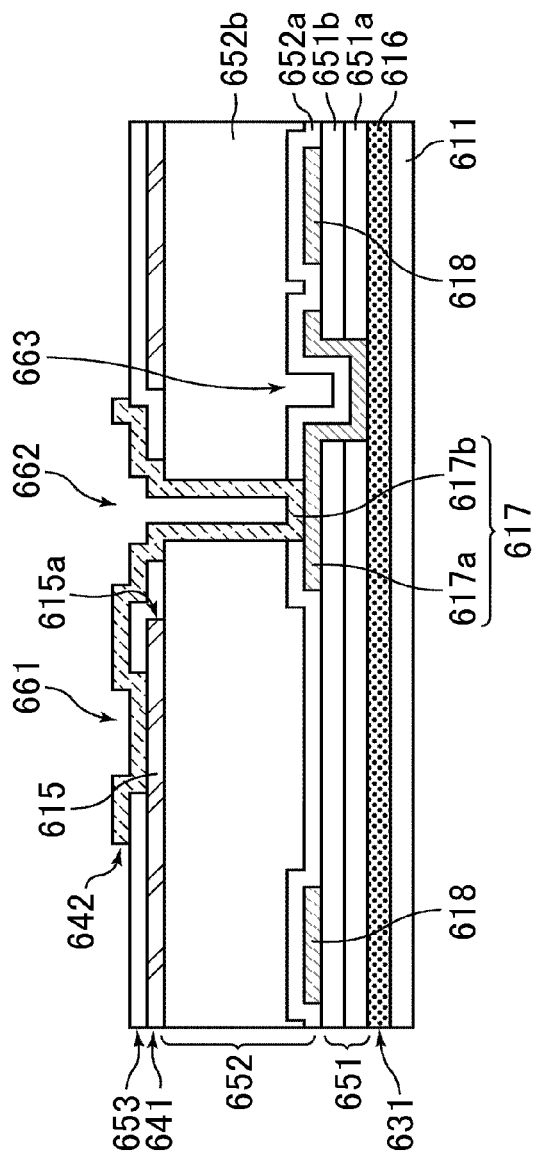
FIG. 17 is a schematic cross-sectional view of an array substrate in a liquid crystal display of Embodiment 6 and shows a structure around a common trunk wiring.

As shown in FIG. 17, an array substrate in the liquid crystal display of the present embodiment has a transparent insulating substrate 611. On the insulating substrate 611 are stacked a first wiring layer 631 corresponding to the first conductive layer, a first insulating layer 651, a second wiring layer 632 corresponding to the second conductive layer, a second insulating layer 652, a first transparent conductive layer 641 corresponding to the third conductive layer, a third insulating layer 653, and a second transparent conductive layer 642 corresponding to the fourth conductive layer in the stated order. The first insulating layer 651 includes a lower layer 651a and an upper layer 651b stacked on the lower layer 651a. The second insulating layer 652 includes a lower layer 652a and an upper layer 652b stacked on the lower layer 652a.

The array substrate according to the present embodiment has a common trunk wiring 616 formed in the first wiring layer 631, lead wires 618 formed in the second wiring layer 632 above the common trunk wiring 616, a connection electrode 617 formed in the second transparent conductive layer 642, and a common electrode 615 formed in the first transparent conductive layer 641. The connection electrode 617 includes a lower portion 617a formed in the second wiring layer 632 and an upper portion 617b formed in the second transparent conductive layer 642. The connection electrode 617 (the lower portion 617a and the upper portion 617b) is provided between two adjacent lead wires 618.

The third insulating layer 653 has a contact hole 661 formed therein on the common electrode 615. The second insulating layer 652 and the third insulating layer 653 have a contact hole 662 on the lower portion 617a. The common electrode 615 has a cut-out portion 615a formed therein so as not to overlap with the contact hole 662. The first insulating layer 651 has a contact hole 663 formed therein on the common trunk wiring 616. The contact holes 661, 662, and 663 are provided between two adjacent lead wires 618.

The upper portion 617b is connected to the common electrode 615 through the contact hole 661 and also connected to the lower portion 617a through the contact hole 662. The lower portion 617a is connected to the common trunk wiring 616 through the contact hole 663. The common electrode 615 is thus connected to the common trunk wiring 616 via the connection electrode 617 in the flame region and a common signal is supplied to the common electrode 615 from the common trunk wiring 616.

The liquid crystal display of the present embodiment can be produced by the method described in Embodiment 1.

Three contact holes 661, 662, and 663 provided between two adjacent lead wires 618 in the present embodiment is disadvantageous in terms of enhancing the resolution compared to Embodiment 1. However, since there is no need to provide the connection electrode 617 in each region between two adjacent lead wires 618, it is advantageous in terms of enhancing the resolution compared to cases where a contact hole is formed for each bus line.

In each embodiment, the number and position of the connection structure for connecting the common electrode and the common trunk wiring are not particularly limited and may be determined as appropriate. In a case where a plurality of the connection structures are provided, at least one connection structure may have any of the above-described structures. Not all the connection structures need to have one of the above-described structures.

Embodiments 1 to 6 may be combined with one another. For example, connection structures of different embodiments may be provided on the same array substrate In Embodiments 1 to 6, descriptions have been given on the case of a FFS liquid crystal display. The display mode, however, is not particularly limited. For example, the display mode may be the IPS (In-Plane Switching) mode in which the common electrode and the pixel electrode each have a comb-shaped structure or the TBA (Transverse Bend Alignment) mode. In the TBA liquid crystal display, the liquid crystal layer contains nematic liquid crystal molecules having negative dielectric anisotropy. The liquid crystal molecules are vertically aligned when no voltage is applied. The array substrate includes a pair of electrodes (e.g., a common electrode and a pixel electrode each having a comb-shaped structure). The liquid crystal molecules are aligned in a bend state due to a transverse electric field generating between the electrodes. In particular, in the liquid crystal displays of Embodiments 1 to 6, the display mode is preferably a mode in which a transparent common electrode, a transparent pixel electrode and a dielectric substance between the electrodes are provided (hereafter, such a structure is also referred to as the transparent Cs structure) and these members form a storage capacitor. Examples of such a display mode include the CPA (Continuous Pinwheel Alignment) mode in which a transparent Cs structure is provided. In the CPA mode in which a transparent Cs structure is provided, the liquid crystal layer contains nematic liquid crystal molecules having negative dielectric anisotropy. The liquid crystal molecules are vertically aligned when no voltage is applied. The array substrate has a transparent common electrode, an insulating layer on the common electrode, and a transparent pixel electrode on the insulating layer. The counter substrate has a transparent counter electrode facing the pixel electrode and dot-like protrusions (rivets) provided on the counter electrode. The liquid crystal molecules are radially aligned from each protrusion due to a vertical electric field generating between the pixel electrode and the counter electrode.

In Embodiment 1, the case where the common trunk wiring is provided along the whole circumference of the display region has been described. In each embodiment, the arrangement of the common trunk wiring is not particularly limited as long as it is arranged to cross the lead wire formed in the second conductive layer. For example, the common trunk wiring may be arranged only in the vicinity of the lower end of the display region.

In Embodiments 1 to 6, transmission-type liquid crystal displays have been described. The liquid crystal display may be a reflection type or reflection-transmission type. In the case of a reflection type display, for example, a conductive film with a high-reflectivity surface may be used instead of the first transparent conductive film corresponding to the third conductive film. Such a conductive film may be formed from, for example, Al, silver (Ag), platinum (Pt), or an alloy of these. Moreover, the conductive film may be a multilayer film including films of these materials.

In Embodiments 1 to 6, the common electrode has a cut-out portion above the common trunk wiring. Instead of the cut-out portion, an opening section may be provided.

REFERENCE SIGNS LIST

1: liquid crystal panel
2: display portion
3: pixel
4: sub pixel
5: driver chip for source bus line
6: driver circuit for gate bus line
7: array substrate
8: counter substrate
9: display region
10: flame region
11: insulating substrate
12: source bus line
13: gate bus line
14: pixel electrode
14S: slit
15: common electrode
15a: cut-out portion
15b: opening
16: common trunk wiring
17: connection electrode
17a: lower portion
17b: upper portion
17c, 17d: connecting portion
18, 19: lead wire
20: TFT
21: semiconductor layer
22: gate electrode
23: source electrode
24: drain electrode
25, 27, 61, 62, 63: contact hole
26: channel protective layer
31: first wiring layer (first conductive layer)
32: second wiring layer (second conductive layer)
41: first transparent conductive layer (third conductive layer)
42: second transparent conductive layer (fourth conductive layer)
51: first insulating layer
51a: lower layer
51b: upper layer
52: second insulating layer
52a: lower layer
52b: upper layer
53: third insulating layer

The invention claimed is:

1. A liquid crystal display comprising:
an array substrate;
a display portion; and
a plurality of pixels arranged in the display portion,
wherein the array substrate comprises:
an insulating substrate;
a first conductive layer on the insulating substrate;
a first insulating layer on the first conductive layer;
a second conductive layer on the first insulating layer;
a second insulating layer on the second conductive layer;

a third conductive layer on the second insulating layer;
a third insulating layer on the third conductive layer;
a fourth conductive layer on the third insulating layer;
a plurality of bus lines provided in a region corresponding to the display portion;
a plurality of lead wires provided outside the region and each connected to a corresponding bus line;
an electrode provided inside and outside the region and supplies a signal in common to the plurality of pixels;
a wiring provided outside the region, crossing the plurality of lead wires, and transmitting the signal; and
a connection electrode provided outside the region and connecting the electrode with the wiring, wherein
the wiring being provided in the first conductive layer,
the plurality of lead wires being provided in the second conductive layer above the wiring,
the electrode being provided in the third conductive layer,
the connection electrode being provided at least in the fourth conductive layer,
the plurality of lead wires includes first and second lead wires adjacent to each other,
a connecting portion between the connection electrode and the wiring is provided in a space between the first and second lead wires, and
a connecting portion between the connection electrode and the electrode is not provided in the space between the first and second lead wires.

2. The liquid crystal display according to claim 1, wherein the array substrate includes a portion not including the third insulating layer outside the region and on the electrode, and
the connection electrode is connected to the electrode through the portion not including the third insulating layer.

3. The liquid crystal display according to claim 2, wherein the portion not including the third insulating layer is not positioned above the plurality of lead wires.

4. The liquid crystal display according to claim 2, wherein the portion not including the third insulating layer is positioned above the plurality of lead wires.

5. The liquid crystal display according to claim 2, wherein the array substrate includes a portion not including the first insulating layer and the second insulating layer on the wiring,
the portion not including the third insulating layer extends from a region above the portion not including the first insulating layer and the second insulating layer to a region on the electrode, and
the connection electrode is provided in the fourth conductive layer.

6. The liquid crystal display according to claim 2, wherein the array substrate includes a plurality of portions not including the first insulating layer and the second insulating layer on the wiring,
the portion not including the third insulating layer spreads in a belt-like form above the wiring,
in a plan view of the array substrate, the plurality of portions not including the first insulating layer and the second insulating layer and a part of the electrode are positioned in the portion not including the third insulating layer, and
the connection electrode is provided in the fourth conductive layer.

7. The liquid crystal display according to claim 1, wherein the connection electrode includes a lower portion provided in the second conductive layer and an upper portion provided in the fourth conductive layer,
the array substrate includes a portion not including the first insulating layer on the wiring and a portion not including the second insulating layer and the third insulating layer on the lower portion,
the lower portion is connected to the wiring through the portion not including the first insulating layer, and
the upper portion is connected to the lower portion through the portion not including the second insulating layer and the third insulating layer.

8. The liquid crystal display according to claim 1, wherein the array substrate includes a portion not including the first insulating layer, the second insulating layer, and the third insulating layer on the wiring, and
the connection electrode is provided in the fourth conductive layer and connected to the wiring through the portion not including the first insulating layer, the second insulating layer, and the third insulating layer.

9. The liquid crystal display according to claim 1, wherein the array substrate includes a thin film transistor, the thin film transistor includes a semiconductor layer, and the semiconductor layer includes an oxide semiconductor.

10. The liquid crystal display according to claim 1, wherein the second insulating layer includes an organic insulating layer.

11. The liquid crystal display according to claim 10, wherein the second insulating layer includes an inorganic insulating layer, and
the organic insulating layer is stacked on the inorganic insulating layer.

12. The liquid crystal display according to claim 1, wherein the second insulating layer includes a layer etchable with an etchant, and
the third insulating layer includes a layer etchable with the same etchant.

13. The liquid crystal display according to claim 1, wherein the first insulating layer includes a lower layer and an upper layer stacked on the lower layer.

14. The liquid crystal display according to claim 13, wherein the lower layer and the upper layer cover the first conductive layer outside the region.

15. A liquid crystal display comprising:
an array substrate;
a display portion; and
a plurality of pixels arranged in the display portion,
wherein the array substrate comprises:
an insulating substrate;
a first conductive layer on the insulating substrate;
a first insulating layer on the first conductive layer;
a second conductive layer on the first insulating layer;
a second insulating layer on the second conductive layer;
a third conductive layer on the second insulating layer;
a third insulating layer on the third conductive layer;
a fourth conductive layer on the third insulating layer;
a plurality of bus lines provided in a region corresponding to the display portion;
a plurality of lead wires provided outside the region and each connected to a corresponding bus line;
an electrode provided inside and outside the region and supplies a signal in common to the plurality of pixels;
a wiring provided outside the region, crossing the plurality of lead wires, and transmitting the signal; and
a connection electrode provided outside the region and connecting the electrode with the wiring, wherein
the wiring being provided in the first conductive layer,
the plurality of lead wires being provided in the second conductive layer above the wiring,
the electrode being provided in the third conductive layer, the connection electrode being provided at least in the fourth conductive layer,
the array substrate includes a portion not including the third insulating layer outside the region and on the electrode,
the connection electrode is connected to the electrode through the portion not including the third insulating layer, and
the portion not including the third insulating layer is not positioned above the plurality of lead wires.

16. The liquid crystal display according to claim 15, wherein the array substrate includes a portion not including the first insulating layer, the second insulating layer, and the third insulating layer on the wiring, and
the connection electrode is provided in the fourth conductive layer and connected to the wiring through the portion not including the first insulating layer, the second insulating layer, and the third insulating layer.

17. The liquid crystal display according to claim 15, wherein the second insulating layer includes an organic insulating layer.

18. The liquid crystal display according to claim 17, wherein the second insulating layer includes an inorganic insulating layer, and
the organic insulating layer is stacked on the inorganic insulating layer.

19. A liquid crystal display comprising:
an array substrate;
a display portion; and
a plurality of pixels arranged in the display portion,
wherein the array substrate comprises:
an insulating substrate;
a first conductive layer on the insulating substrate;
a first insulating layer on the first conductive layer;
a second conductive layer on the first insulating layer;
a second insulating layer on the second conductive layer;
a third conductive layer on the second insulating layer;
a third insulating layer on the third conductive layer;
a fourth conductive layer on the third insulating layer;
a plurality of bus lines provided in a region corresponding to the display portion;
a plurality of lead wires provided outside the region and each connected to a corresponding bus line;
an electrode provided inside and outside the region and supplies a signal in common to the plurality of pixels;
a wiring provided outside the region, crossing the plurality of lead wires, and transmitting the signal; and
a connection electrode provided outside the region and connecting the electrode with the wiring, wherein
the wiring being provided in the first conductive layer,
the plurality of lead wires being provided in the second conductive layer above the wiring,
the electrode being provided in the third conductive layer,
the connection electrode being provided at least in the fourth conductive layer,
the array substrate includes a portion not including the third insulating layer outside the region and on the electrode,
the connection electrode is connected to the electrode through the portion not including the third insulating layer,
the array substrate includes a portion not including the first insulating layer and the second insulating layer on the wiring,
the portion not including the third insulating layer extends from a region above the portion not including the first insulating layer and the second insulating layer to a region on the electrode, and
the connection electrode is provided in the fourth conductive layer.

20. The liquid crystal display according to claim 19, wherein the connection electrode includes a lower portion provided in the second conductive layer and an upper portion provided in the fourth conductive layer,
the array substrate includes a portion not including the first insulating layer on the wiring and a portion not including the second insulating layer and the third insulating layer on the lower portion,
the lower portion is connected to the wiring through the portion not including the first insulating layer, and
the upper portion is connected to the lower portion through the portion not including the second insulating layer and the third insulating layer.

21. The liquid crystal display according to claim 19, wherein the array substrate includes a portion not including the first insulating layer, the second insulating layer, and the third insulating layer on the wiring, and
the connection electrode is provided in the fourth conductive layer and connected to the wiring through the portion not including the first insulating layer, the second insulating layer, and the third insulating layer.

22. The liquid crystal display according to claim 19, wherein the array substrate includes a thin film transistor, the thin film transistor includes a semiconductor layer, and the semiconductor layer includes an oxide semiconductor.

23. The liquid crystal display according to claim 19, wherein the second insulating layer includes an organic insulating layer.

24. The liquid crystal display according to claim 23, wherein the second insulating layer includes an inorganic insulating layer, and
the organic insulating layer is stacked on the inorganic insulating layer.

25. The liquid crystal display according to claim 19, wherein the second insulating layer includes a layer etchable with an etchant, and
the third insulating layer includes a layer etchable with the same etchant.

26. The liquid crystal display according to claim 19, wherein the first insulating layer includes a lower layer and an upper layer stacked on the lower layer.

27. The liquid crystal display according to claim 26, wherein the lower layer and the upper layer cover the first conductive layer outside the region.

* * * * *